United States Patent [19]
Cornford

[11] 3,784,265
[45] Jan. 8, 1974

[54] JOURNAL BEARING

[76] Inventor: Arthur Selwyn Cornford, 561 Bobolink Rd., Mississauga, Ontario, Canada

[22] Filed: Dec. 18, 1972

[21] Appl. No.: 316,135

[52] U.S. Cl. ................................................ 308/73
[51] Int. Cl. ........................................... F16c 17/06
[58] Field of Search ....................................... 308/73

[56] References Cited
FOREIGN PATENTS OR APPLICATIONS
1,353,660  1/1964  France .............................. 308/73

Primary Examiner—Charles J. Myhre
Assistant Examiner—Frank Susko
Attorney—J. A. Legris

[57] ABSTRACT

In a journal bearing for large cylindrical journals, the load is distributed equally over two pairs of bearing shoes, the shoes of each pair being mounted by spherical pivots on a respective rocker member. Each of the rocker members is pivoted about an axis extending parallel to the bearing axis, the pivotal axes being symmetrically disposed on opposite sides of a vertical plane intersecting the journal axis. Thus the load is distributed in such a way as to minimize bending stresses in the bearing support structure. Means are provided to permit removal of a bearing shoe without dismantling of the bearing assembly.

8 Claims, 6 Drawing Figures

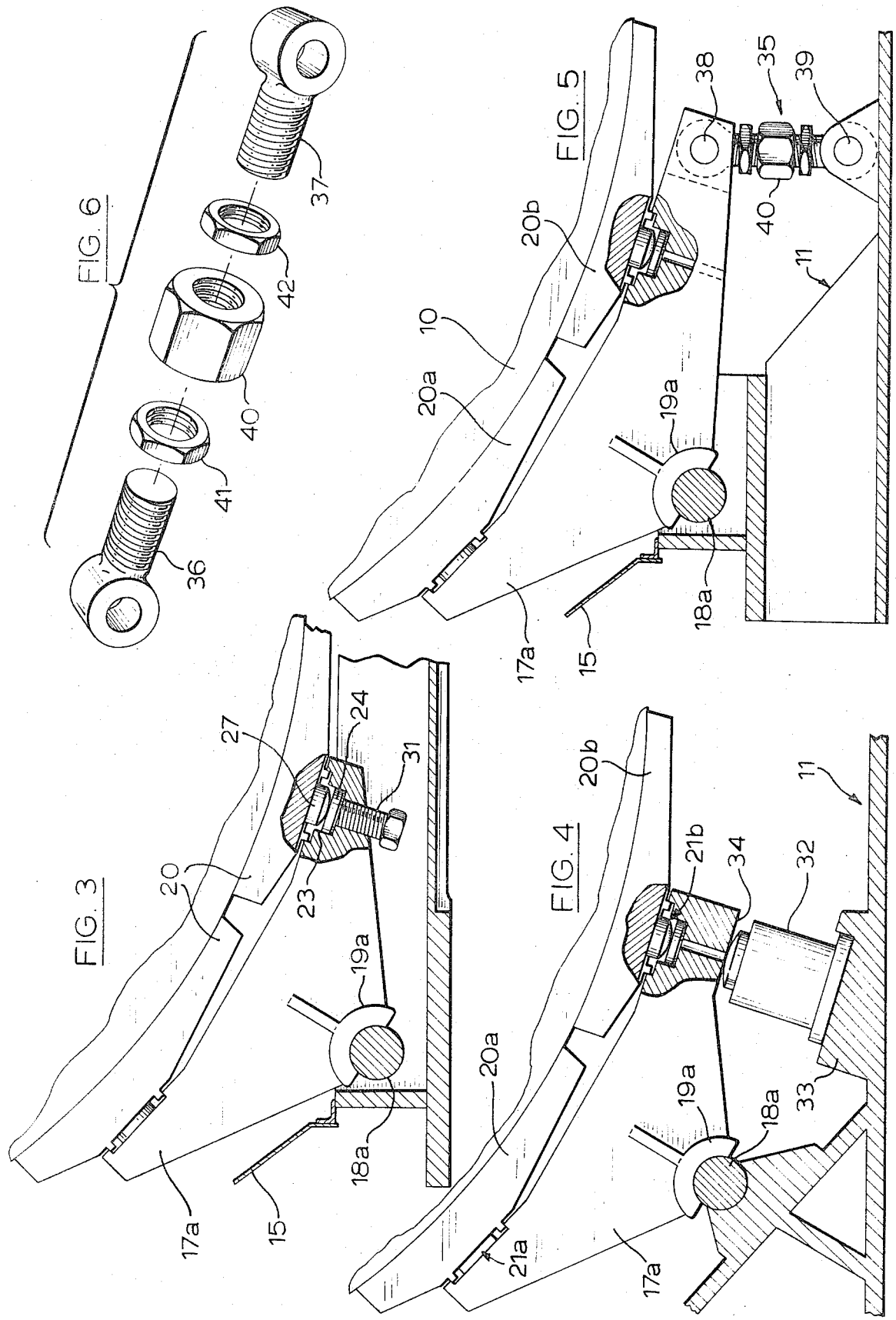

JOURNAL BEARING

This invention relates to journal bearings, and is concerned particularly with journal bearings for supporting heavily loaded cylindrical journals of large diameter wherein a load is distributed over a plurality of pivoted bearing shoes which accomodate themselves to the journal to obtain equal load distribution.

A journal bearing of this general type is des-cribed in Canadian Pat. No. 637,709 of A. S. Cornford, dated Mar. 6, 1962 and entitled "Trunnion Bearing."

It is one object of the present invention to provide a journal bearing of this type wherein the load is distributed in such a way as to minimize bending stresses in the bearing housing or support structure so as to reduce the overall cost of construction of the latter.

It is another object of the invention to provide a journal bearing of this type wherein a bearing shoe may be removed and replaced without the need for external jacking means.

A journal bearing according to the invention comprises a stationary support structure, and a pair of rocker members which are pivotally connected to the support structure for pivotal movement about respective pivotal axes extending parallel to the journal axis, the pivotal axes being symmetrically disposed on opposite sides of a medial vertical plane intersecting the journal axis; each rocker member supports a pair of bearing shoes conforming to the journal, the bearing shoes being supported by universal mountings which permit the shoes to accommodate themselves to load deflections and which, furthermore, distribute the load automatically and equally between the bearing shoes.

In order that the invention may be readily understood, one embodiment thereof will now be described by way of example with reference to the accompanying drawings, in which:

FIG. 3 shows in part-sectional elevation a detail of a modified bearing;

FIG. 4 shows in part-sectional elevation a detail of another modification;

FIG. 5 shows in part-sectional elevation a detail of yet another modification of the invention; and FIG. 6 is an exploded perspective view of a turnbuckle forming part of the modification illustrated in FIG. 5.

Figure 1:
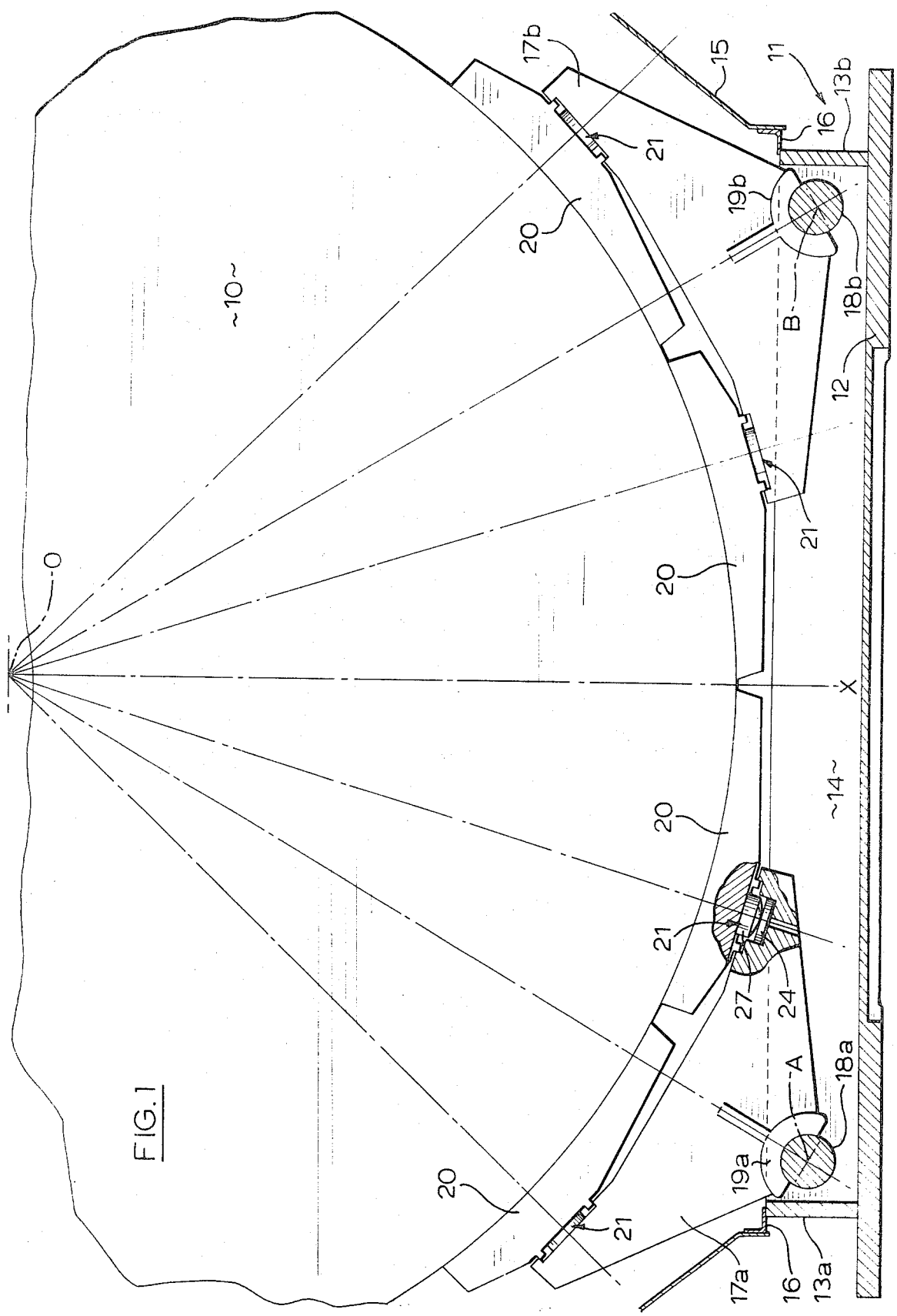
FIG. 1 is a sectional end elevation of a journal bearing, the figure showing part of a journal and part of the bearing housing.

Referring to FIG. 1, there is shown part of a cylindrical journal 10 provided at one end of a large rotary grinding mill journalled for rotation about a substantially horizontal axis. The journal axis is denoted at the point O. A similar journal is provided at the other end of the mill. The journal is supported in a journal bearing which comprises a bearing housing, or support structure 11, the latter being mounted on a strong foundation capable of supporting the full load to be supported. The support structure comprises a base 12, to which are welded a pair of axially extending upstanding plates 13a, 13b, and a pair of transverse tie bars 14, a housing member 15 being connected to the plates 13a, 13b and tie bars by angle members 16 to which it is welded. The support structure defines a sump for lubricant.

A pair of laterally spaced rocker members 17a, 17b are pivotally connected to the support structure for pivotal movement about respective pivotal axes A, B which extend parallel to the journal axis O and lie in a common horizontal plane. Each of the pivotal mountings of the rocker members comprises a fixed cylindrical shaft 18a (or 18b) extending longitudinally between the tie bars 14 and connected thereto at its ends, and a part-cylindrical shoe or plate 19a (or 19b) which is welded to the respective rocker member and embraces the shaft so as to slide or rock on the latter and permit pivotal movement of the rocker member.

The journal 10 is supported directly by four laterally spaced bearing shoes 20, each bearing shoe providing a part-cylindrical bearing surface which conforms to the surface of the journal, and being mounted on a rocker member by means of a respective one of four universal mountings, or spherical pivots 21, which permits the shoe to align itself in any direction. Lubricant is applied to the surface of each of the bearing shoes in the manner described in the above-identified Canadian patent. The system by which the lubricant is fed does not form part of the present invention and will not be described herein.

Since the rocker members are free to pivot about the longitudinal axes A, B, and since the bearing shoes are free to align themselves in any direction, the assembly is such that the bearing load is automatically distributed equally over the four shoes and transmitted thereby to the support structure, regardless of small deflections of the journal under load or deformation of the journal. The load transmitted to the support structure has a vertical component which is reacted in the normal way by the foundation on which the support structure is mounted. The transmitted load also has two horizontal components which act on the support structure in opposite directions through the cylindrical shafts 18a, 18b. It is an important feature of the invention that the axes A, B of the shafts 18a, 18b are symmetrically disposed on opposite sides of a vertical plane, denoted by the line OX, intersecting the journal axis O; therefore, since the load is equally distributed over the shoes 20 which are mounted for universal pivotal movement, the horizontal components of the transmitted load cancel one another out and produce no bending stresses in the support structure 11. The pairs of universal mountings 21 are, of course, provided on the rocker members on opposite sides of the radial planes OA and OB, which intersect the journal axes and the respective pivotal axes of the rocker members.

Figure 2:
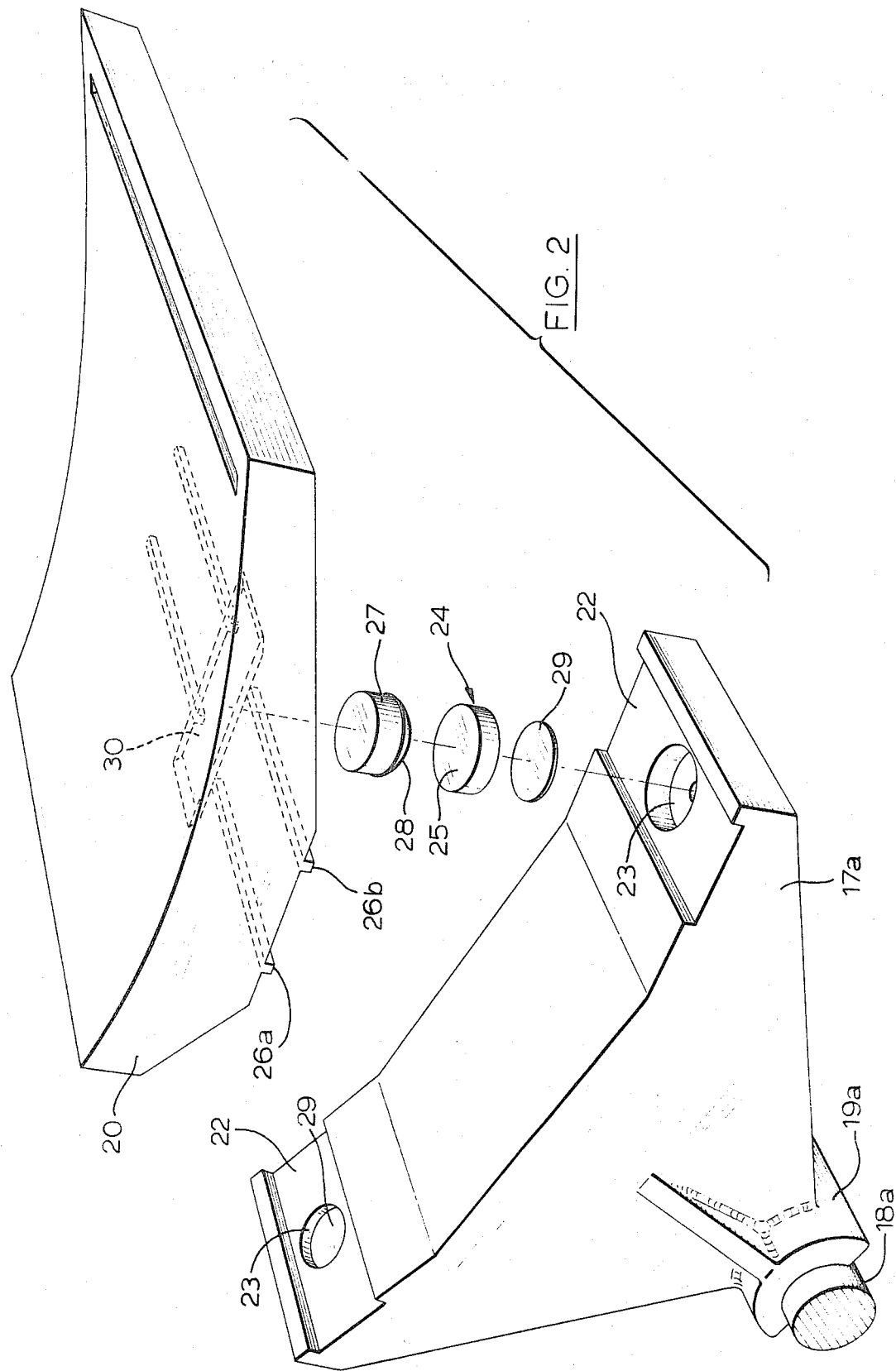
FIG. 2 is an exploded perspective view of a detail of the journal bearing of FIG. 1.

Each of the rocker members 17a, 17b, provides a pair of laterally spaced channels 22 (as best shown in FIG. 2), each of the channels having a flat base formed with a cylindrical recess 23. A disc-shaped bearing pad 24 having a flat bearing surface 25 is located in the recess. The underside of each bearing shoe 20 is formed with a pair of laterally spaced, axially extending flanges 26a, 26b, which engage in a respective one of the channels 22 to locate the bearing shoe with respect to the rocker member. A cylindrical member 27 projects from the underside of each bearing shoe between the flanges 26a, 26b; each of the members 27 is located by a shallow groove 30 in the bearing shoe and has a part-spherical end surface 28 which bears on the surface 25 of a respective bearing pad 24 to provide a spherical pivot.

During assembly of the bearing the journal may be centered easily in the bearing housing by the use of shims or packing pieces interposed beneath one or other of the lower bearing pads 24. One such packing piece is illustrated in FIG. 2 at 29. However, the modified embodiment illustrated in FIG. 3 eliminates the use of shims or packing pieces. In this embodiment each of the rocker members 17a, 17b is formed with an internally threaded cylindrical bore which is coaxial with the well 23, and an adjustment screw 31 is threaded into the bore and engages at its end the bearing pad 24. By adjustment of the screw 31 the respective spherical pivot may be positioned with respect to the rocker member as required without dismantling the bearing.

FIG. 4 illustrates a further modification in which an extensible hydraulic jack 32 may be inserted between the support structure and one end of a rocker member for the purpose of jacking the assembly to permit removal and replacement of one of the bearing shoes. In the arrangement illustrated, the jack is removably mounted between a step 33 formed on the support structure 11 and a step 34 formed on the underside of the rocker member 17a. The steps 33 and 34 are opposed to one other for engagement with the jack 32, the latter being aligned with the spherical pivot 21b of the shoe 20b. When the jack is extended, clearly, the load is removed from the pivot 21a and the shoe 20a can readily be removed from the assembly.

FIG. 5 shows an alternative arrangement in which the jack 32 is replaced by a turnbuckle 35, the details of the latter being shown in the exploded view of FIG. 6. The turnbuckle 35 comprises a pair of connectors 36, 37, each having a screw-threaded shank, the shanks having a left hand thread and a right hand thread respectively. The connector 36 is connected to a swivel 38 at one end of the rocker member, and the connector 37 is connected to a swivel 39 fitted to the base support structure 11, the two threaded shanks being engaged by a nut 40 which can be held in a set position by lock nuts 41 and 42. By turning the nut 40 in one direction or the other, one may extend or retract the turnbuckle connection 35 so as to remove the load from one or other of the bearing shoes 20a, 20b and so permit it to be removed and replaced. The turnbuckle 35, of course, as in the case of the hydraulic jack 32 of FIG. 4, is removable and would only be used in the position shown for the purpose of removing a bearing shown. In normal use of the journal bearing neither the turnbuckle nor the jack would be connected to the rocker member.

What I claim as my invention is:

1. A journal bearing for supporting a cylindrical journal having a journal surface and a substantially horizontal axis, comprising a stationary support structure, a pair of rocker members pivotally connected to the support structure for pivotal movement about respective pivotal axes extending parallel to the journal axis, said pivotal axes being symmetrically disposed on opposite sides of a vertical plane intersecting the journal axis, each rocker member providing a pair of universal mountings disposed on opposite sides of a plane intersecting the journal axis and the respective pivotal axis, and two pairs of bearing shoes tiltably mounted on the rocker members by said universal mounting, each bearing shoe providing a bearing surface conforming to the journal surface.

2. A journal bearing according to claim 1, wherein each universal mounting comprises a spherical pivot comprising a first bearing member located by the rocker member and a second bearing member located by a bearing shoe, said bearing members providing cooperating flat and spherical bearing surfaces.

3. A journal bearing according to claim 1, wherein the support structure is constructed to provide a sump for lubricant.

4. A journal bearing according to claim 1, wherein each of the rocker members is pivotally connected to the support structure by a cylindrical pivot comprising a stationary cylindrical shaft mounted in the support structure and a part-cylindrical plate connected to the rocker member and embracing the shaft.

5. A journal bearing according to claim 1, each of said universal mountings comprising a spherical pivot, wherein each of the rocker members is provided with a screw-threaded cylindrical bore having an axis which intersects the journal axis and an adjustment screw engaging in the bore and connected to one of the spherical pivots for adjustably positioning the latter with respect to the rocker member.

6. A journal bearing according to claim 1, including an extensible jack adapted to be positioned between the support structure and one of said rocker members in alignment with a selected one of said universal mountings, the support structure and the rocker member providing a pair of opposed stepped surfaces for engagement with the jack whereby to permit jacking of the bearing for removal of a selected shoe.

7. A journal bearing according to claim 1, including a turnbuckle extending between the support structure and a selected one of the rocker members, the support structure and the rocker member providing anchoring means for connection to respective ends of the turnbuckle whereby to permit jacking of the bearing for removal of a selected shoe.

8. A journal bearing according to claim 1, wherein each rocker member provides a pair of laterally spaced channels extending parallel to the pivotal axes, the base of each channel providing a cylindrical recess wherein a disc-shaped bearing pad is located, each bearing shoe being formed with a pair of laterally spaced axially extending flanges engaging in a respective one of said channels for locating the bearing shoe, each bearing shoe further providing a bearing pad having a spherical bearing surface which is engageable with a respective disshaped bearing pad.

* * * * *